US009357210B2

(12) United States Patent
Orton-Jay et al.

(10) Patent No.: US 9,357,210 B2
(45) Date of Patent: *May 31, 2016

(54) SYSTEMS AND METHODS OF ENCODING MULTIPLE VIDEO STREAMS FOR ADAPTIVE BITRATE STREAMING

(71) Applicant: Sonic IP, Inc., San Diego, CA (US)

(72) Inventors: Sam Orton-Jay, Kent (GB); Ivan Vladimirovich Naletov, Tomsk (RU)

(73) Assignee: Sonic IP, Inc., San Diego, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 13/830,914

(22) Filed: Mar. 14, 2013

(65) Prior Publication Data

US 2014/0241420 A1    Aug. 28, 2014

Related U.S. Application Data

(60) Provisional application No. 61/771,024, filed on Feb. 28, 2013.

(51) Int. Cl.
*H04N 19/124*    (2014.01)
*H04N 19/176*    (2014.01)
(Continued)

(52) U.S. Cl.
CPC ......... *H04N 19/0009* (2013.01); *H04N 19/119* (2014.11); *H04N 19/124* (2014.11); *H04N 19/146* (2014.11); *H04N 19/176* (2014.11);
(Continued)

(58) Field of Classification Search
None
See application file for complete search history.

(56) References Cited

U.S. PATENT DOCUMENTS 6,195,388 B1    2/2001    Choi et al.
6,229,850 B1    5/2001    Linzer et al.
(Continued)

FOREIGN PATENT DOCUMENTS

JP    08195956    7/1996
JP    2001503225 A    3/2001
(Continued)

OTHER PUBLICATIONS

International Search Report and Written Opinion for International Application No. PCT/IB2013/001122, International Filing Date Apr. 28, 2013, Search Completed Oct. 21, 2013, Mailed Nov. 5, 2013, 13 pgs.

(Continued)

*Primary Examiner* — Geepy Pe
*Assistant Examiner* — William Adrovel
(74) *Attorney, Agent, or Firm* — KPPB LLP

(57) ABSTRACT

Systems and methods for encoding multiple video streams in accordance with embodiments of the invention are disclosed. In one embodiment, a source encoder configured to encode source video as a number of alternative video streams includes a parallel processing system configured to collect statistics on source video data and write the statistics to shared memory in a first pass through received multimedia content, determine initial encoding information for source video data and write the initial encoding information to shared memory during the first pass, encode the source video data in parallel using collected statistics and initial encoding information to produce a plurality of alternative video streams during a second pass, and parallel encoding processes are configured to reuse additional encoding information that has already been determined for a portion of video and to generate additional encoding information that has not already been determined for a portion of video.

24 Claims, 6 Drawing Sheets

(51) Int. Cl.
*H04N 19/119* (2014.01)
*H04N 19/146* (2014.01)
*H04N 19/194* (2014.01)
*H04N 19/436* (2014.01)
*H04N 19/147* (2014.01)

(52) U.S. Cl.
CPC .......... *H04N 19/194* (2014.11); *H04N 19/436* (2014.11); *H04N 19/147* (2014.11)

(56) References Cited

U.S. PATENT DOCUMENTS

| | | |
|---|---|---|
| 6,343,098 B1 | 1/2002 | Boyce |
| 6,859,496 B1 | 2/2005 | Boroczky et al. |
| 6,956,901 B2 | 10/2005 | Boroczky et al. |
| 8,023,562 B2 | 9/2011 | Zheludkov et al. |
| 8,054,880 B2 | 11/2011 | Yu et al. |
| 8,249,168 B2 | 8/2012 | Graves |
| 8,270,473 B2 | 9/2012 | Chen et al. |
| 8,311,115 B2 | 11/2012 | Gu et al. |
| 2002/0085638 A1 | 7/2002 | Morad et al. |
| 2003/0012275 A1 | 1/2003 | Boice et al. |
| 2006/0126728 A1* | 6/2006 | Yu et al. ............ 375/240.03 |
| 2007/0002946 A1 | 1/2007 | Bouton et al. |
| 2007/0053444 A1 | 3/2007 | Shibata et al. |
| 2007/0074266 A1 | 3/2007 | Raveendran et al. |
| 2007/0086528 A1 | 4/2007 | Mauchly et al. |
| 2007/0153914 A1 | 7/2007 | Hannuksela et al. |
| 2008/0137736 A1 | 6/2008 | Richardson et al. |
| 2009/0132721 A1 | 5/2009 | Soroushian et al. |
| 2009/0168880 A1 | 7/2009 | Jeon et al. |
| 2010/0020878 A1 | 1/2010 | Liang et al. |
| 2010/0111192 A1 | 5/2010 | Graves |
| 2010/0189183 A1 | 7/2010 | Gu et al. |
| 2010/0195713 A1 | 8/2010 | Coulombe et al. |
| 2010/0316126 A1 | 12/2010 | Chen et al. |
| 2010/0322302 A1 | 12/2010 | Rodriguez et al. |
| 2011/0090960 A1* | 4/2011 | Leontaris et al. ....... 375/240.12 |
| 2011/0129202 A1 | 6/2011 | Soroushian |
| 2011/0170790 A1* | 7/2011 | Cheon et al. .................. 382/233 |
| 2011/0255555 A1 | 10/2011 | Alexander |
| 2011/0268178 A1 | 11/2011 | Park et al. |
| 2011/0305273 A1* | 12/2011 | He et al. ............ 375/240.02 |
| 2012/0177101 A1* | 7/2012 | van der Schaar ....... 375/240.01 |
| 2012/0307883 A1 | 12/2012 | Graves |
| 2013/0034166 A1* | 2/2013 | Shiodera et al. ......... 375/240.16 |
| 2013/0128970 A1 | 5/2013 | Yu et al. |
| 2013/0322517 A1 | 12/2013 | Zurpal et al. |
| 2014/0241421 A1 | 8/2014 | Orton-Jay et al. |

FOREIGN PATENT DOCUMENTS

| | | |
|---|---|---|
| JP | 2005229593 A | 8/2005 |
| JP | 2010258894 A | 11/2010 |
| WO | 2010114092 A1 | 10/2010 |
| WO | 2012009485 A1 | 1/2012 |
| WO | 2013181013 A1 | 12/2013 |
| WO | 2013181013 A8 | 12/2013 |
| WO | 2014132098 A1 | 9/2014 |
| WO | 2014190308 A1 | 11/2014 |

OTHER PUBLICATIONS

Anonymous, "Method for the Encoding of a Compressed Video Sequence Derived from the Same Video Sequence Compressed at a Different Bit Rate without Loss of Data", ip.com, ip.com No. IPCOM000008165D, May 22, 2012, pp. 1-9.
International Search Report and Written Opinion for International Application PCT/US2013/041874, International Filing Date May 20, 2013, Search completed Jul. 16, 2013, Mailed Jul. 24, 2013, 7 pgs.
International Search Report and Written Opinion for International Application PCT/US2014/039425, International Filing Date Mar. 23, 2014, Report Completed Sep. 15, 2014, Mailed Oct. 17, 2014, 9 Pgs.
International Preliminary Report on Patentability for International Application PCT/US2013/041874, report completed Jul. 16, 2013, Mailed Dec. 11, 2014, 6 Pgs.
International Preliminary Report on Patentability for International Application PCT/IB2013/001122, Report Issued Sep. 1, 2015, Mailed Sep. 11, 2015, 11 Pgs.
Mitsumura, Marino et al., "Analytical study of feedback-based rate control at application layer for video streaming services", Technical study report of the institute of electronics, information and Communication Engineers, vol. 111, No. 468, Mar. 1, 2012, pp. 203 to 208, ISSN: 0913-5685.
Senda, Yuzo, "Seamless video service and video transcoder", NEC technical journal, vol. 51, No. 8, NEC Creative, Aug. 25, 1998, pp. 46 to 49, ISSN: 0285-4139.

* cited by examiner

US 9,357,210 B2

SYSTEMS AND METHODS OF ENCODING MULTIPLE VIDEO STREAMS FOR ADAPTIVE BITRATE STREAMING

CROSS-REFERENCE TO RELATED APPLICATIONS

The present invention claims priority under 35 U.S.C. §119 (e) to U.S. Provisional Patent Application No. 61/771,024, entitled "Systems and Methods for Encoding Multiple Video Streams for Adaptive Bitrate Streaming", to Orton-Jay et al., filed Feb. 28, 2013, the disclosure of which is incorporated by reference herein in its entirety.

FIELD OF THE INVENTION

The present invention generally relates to video encoding and more specifically to systems and methods for efficiently encoding multiple streams of video content for adaptive bitrate streaming from a source video stream.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming, or adaptive streaming, involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources. When a playback device commences adaptive bitrate streaming, the playback device typically starts by requesting portions of media from the lowest bitrate streams (where alternative streams are available). As the playback device downloads the requested media, the playback device can measure the available bandwidth. In the event that there is additional bandwidth available, the playback device can switch to higher bitrate streams.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, California utilizes an extension of the Matroska container format, including elements that are not specified within the Matroska format. Other commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming. The video in the alternate streams can be encoded pursuant to a variety of block-oriented video compression standards (or codecs) such as High Efficiency Video Coding (HEVC/H.265) specified jointly by the ISO/IEC Moving Picture Experts Group (MPEG) and the International Telecommunication Union Telecommunication Standardization Sector (ITU-T) of Geneva, Switzerland and H.264/MPEG-4 AVC (Advanced Video Coding) standard specified by the ITU-T.

SUMMARY OF THE INVENTION

Systems and methods for encoding multiple video streams for adaptive bitrate streaming in accordance with embodiments of the invention are disclosed. In one embodiment, a source encoder configured to encode source video as a number of alternative video streams includes memory containing a source encoder application, a shared memory, and a parallel processing system configured by the source encoding application to receive multimedia content, where the multimedia content includes source video data having a primary resolution, collect statistics on source video data and write the statistics to shared memory in a first pass through the received multimedia content, determine initial encoding information for source video data and write the initial encoding information to shared memory during the first pass through the received multimedia content, encode the source video data in parallel using collected statistics and initial encoding information to produce a plurality of alternative video streams during a second pass through the received multimedia content with a plurality of parallel encoding processes, where the encoding of the source video utilizes additional encoding information, the parallel encoding processes are configured to reuse additional encoding information that has already been determined for a portion of video by another parallel encoding process and stored in the shared memory, and the parallel encoding processes are configured to generate additional encoding information that has not already been determined for a portion of video by another parallel encoding process and store the generated additional encoding information in the shared memory.

In a further embodiment, statistics on source video data includes statistics selected from the group of average quantization parameter, size of header bits, size of texture bits, number of intra blocks, number of inter blocks, and number of skip blocks.

In another embodiment, the parallel processing system being configured to determine initial encoding information for source video data also includes the parallel processing system configured to calculate a frame complexity measure.

In a still further embodiment, the parallel encoding processes being configured to generate additional encoding information that has not already been determined for a portion of video by another parallel encoding process also includes determining a Coding Tree Unit (CTU) size for encoding a portion of a frame of video in the source video data.

In still another embodiment, determining a CTU size for encoding a portion of a frame of video in the source video data includes selecting a portion of a frame of video to encode as at least one output CTU in a first output stream, checking if a size has been determined for a similar CTU, selecting a CTU size if a size has not been determined for the similar CTU, selecting a previously determined CTU size that was determined for a second output stream and comparing the resolution of the first output stream to the resolution of the second output stream if a size has been determined for a similar CTU, scaling the CTU size if the resolution of the first output stream is not the same resolution as the second output stream, determining if the selected CTU size is acceptable for the output CTU, selecting a smaller CTU size when the selected CTU size is not acceptable, applying the selected CTU size to the portion of the frame of video if the selected CTU size is acceptable for the output CTU.

In a yet further embodiment, the parallel processing system being configured to determine initial encoding information for source video data also includes the parallel processing system configured to determine a mode distribution for at least one frame of video in at least one of the plurality of alternative video streams.

In yet another embodiment, the parallel processing system being configured to encode the source video data in parallel using collected statistics and initial encoding information to produce a plurality of alternative video streams also includes the parallel processing system being configured to maintain a count of blocks processed in a frame of video in an alternative video stream, determine a threshold number of blocks based on the mode distribution, and adjust criteria for block type decisions if the count of blocks meets the threshold number of blocks.

In a further embodiment again, the parallel encoding processes being configured to reuse additional encoding information that has already been determined for a portion of video by another parallel encoding process and stored in the shared memory also includes the parallel encoding processes being configured to determine whether a motion vector exists for a second corresponding block in a second alternative stream when encoding a first block in a video frame in a first alternative stream, determine if the first alternative stream and the second alternative stream are the same resolution, scale the motion vector if the first alternative stream and the second alternative stream are not the same resolution, refine the motion vector, and apply the motion vector in encoding the first block in the video frame in the first alternative stream.

In another embodiment again, initial encoding information also includes header size, macroblock size, and the relative proportion of header size to macroblock size.

In a further additional embodiment, initial encoding information also includes hypothetical reference decoder data.

In another additional embodiment, each of the parallel encoding processes encodes at a different resolution.

In a still yet further embodiment, each of the parallel encoding processes encodes one or more alternative video streams and each of the alternative video streams encoded by a parallel encoding process is a different bitrate.

In still yet another embodiment, each of the parallel encoding processes encodes a block from the source video data into each stream in a subset of the plurality of alternative video streams sequentially one after another.

In a still further embodiment again, additional encoding information includes rate distortion information and quantization parameters.

Still another embodiment again includes receiving multimedia content, where the multimedia content includes source video data having a primary resolution using a source encoder, collecting statistics on source video data and writing the statistics to shared memory in a first pass through the received multimedia content using a source encoder, determining initial encoding information for source video data and writing the initial encoding information to a shared memory during the first pass through the received multimedia content using a source encoder, encoding the source video data in parallel using collected statistics, initial encoding information, and additional encoding information to produce a plurality of alternative video streams during a second pass through the received multimedia content with a plurality of parallel encoding processes using a source encoder, where encoding of the source video also includes reusing additional encoding information that has already been determined for a portion of video by another parallel encoding process and stored in the shared memory using at least one of the plurality of parallel encoding processes, and generating additional encoding information that has not already been determined for a portion of video by another of the plurality of parallel encoding processes, and storing the generated additional encoding information in the shared memory using a parallel encoder process.

In a still further additional embodiment, statistics on source video data includes statistics selected from the group consisting of: average quantization parameter, size of header bits, size of texture bits, number of intra blocks, number of inter blocks, and number of skip blocks.

In still another additional embodiment, determining initial encoding information for source video data also includes calculating a frame complexity measure.

In a yet further embodiment again, generating additional encoding information that has not already been determined for a portion of video by another parallel encoding process also includes determining a Coding Tree Unit (CTU) size for encoding a portion of a frame of video in the source video data.

In yet another embodiment again, determining a CTU size for encoding a portion of a frame of video in the source video data also includes selecting a portion of a frame of video to encode as at least one output CTU in a first output stream, checking if a size has been determined for a similar CTU, selecting a CTU size if a size has not been determined for the similar CTU, selecting a previously determined CTU size that was determined for a second output stream and comparing the resolution of the first output stream to the resolution of the second output stream if a size has been determined for a similar CTU, scaling the CTU size if the resolution of the first output stream is not the same resolution as second output stream, determining if the selected CTU size is acceptable for the output CTU, selecting a smaller CTU size if the selected CTU size is not acceptable, applying the selected CTU size to the portion of the frame of video if the selected CTU size is acceptable for the output CTU.

In a yet further additional embodiment, determining initial encoding information for source video data also includes determining a mode distribution for at least one frame of video in at least one of the plurality of alternative video streams.

In yet another additional embodiment, encoding the source video data in parallel using collected statistics, initial encoding information, and additional encoding information to produce a plurality of alternative video streams also includes maintaining a count of blocks processed in a frame of video in an alternative video stream, determining a threshold number of blocks based on the mode distribution, and adjusting criteria for block type decisions if the count of blocks meets the threshold number of blocks.

In a further additional embodiment again, reusing additional encoding information that has already been determined for a portion of video by another parallel encoding process and stored in the shared memory also includes determining whether a motion vector exists for a second corresponding block in a second alternative stream when encoding a first block in a video frame in a first alternative stream, determining if the first alternative stream and the second alternative stream are the same resolution, scaling the motion vector if the first alternative stream and the second alternative stream are not the same resolution, refining the motion vector, and applying the motion vector in encoding the first block in the video frame in the first alternative stream.

In another additional embodiment again, initial encoding information also includes header size, macroblock size, and the relative proportion of header size to macroblock size.

In a still yet further embodiment again, initial encoding information also includes hypothetical reference decoder data.

In still yet another embodiment again, each of the parallel encoding processes encodes at a different resolution.

In a still yet further additional embodiment, each of the parallel encoding processes encodes one or more alternative video streams and each of the alternative video streams encoded by a parallel encoding process is a different bitrate.

In still yet another additional embodiment, each of the parallel encoding processes encodes a block from the source video data into each stream in a subset of the plurality of alternative video streams sequentially one after another.

In a yet further additional embodiment again, additional encoding information includes rate distortion information and quantization parameters.

DETAILED DISCLOSURE OF THE INVENTION

Figure 1:
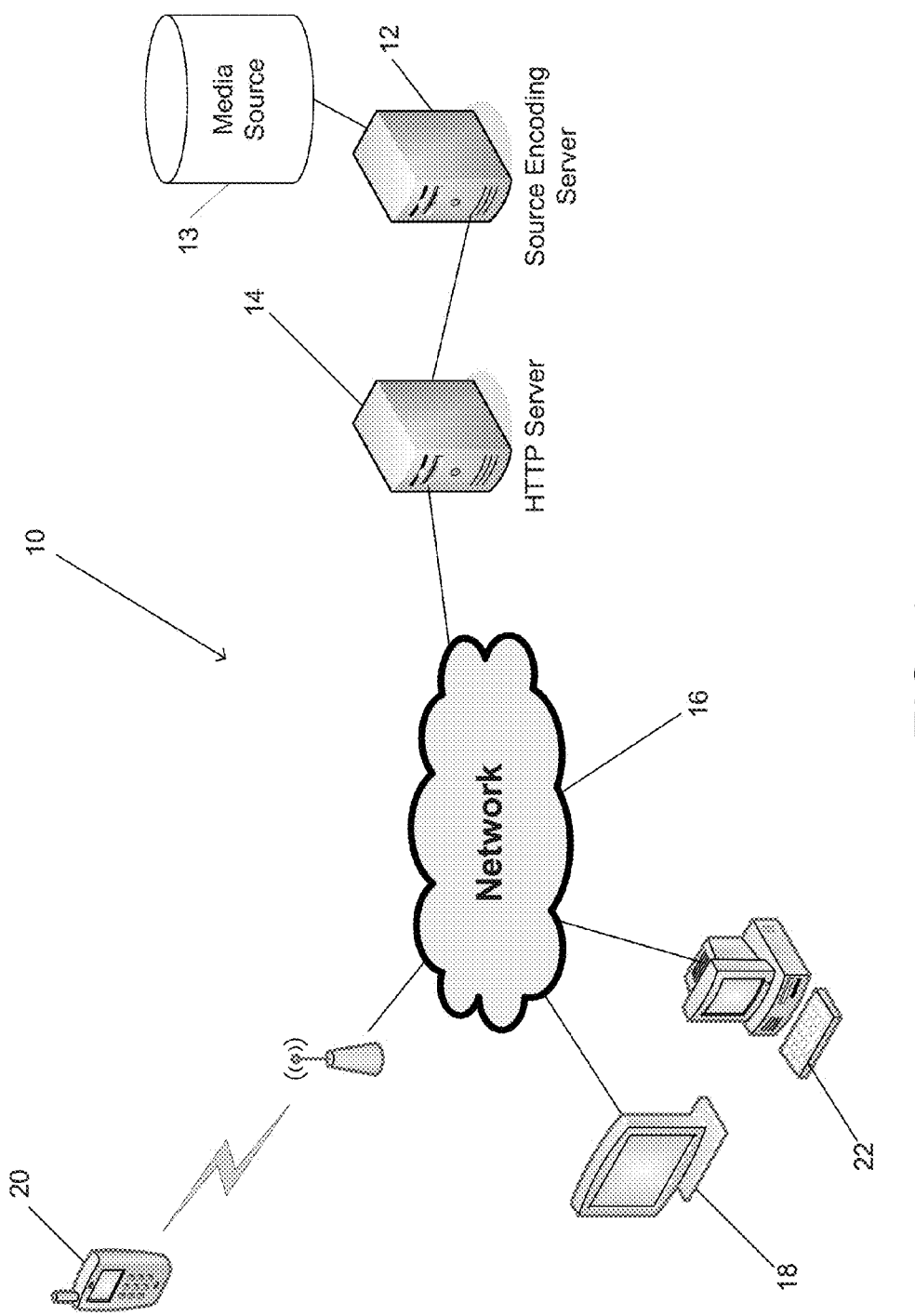
FIG. 1 is a system diagram of an adaptive streaming system in accordance with embodiments of the invention.

Turning now to the drawings, systems and methods for encoding multiple video streams for adaptive bitrate streaming in accordance with embodiments of the invention are illustrated. In accordance with embodiments of the invention, encoders can analyze media content for statistics about the content, determine encoding information used to encode the content, and encode the content as multiple video streams at different resolutions and bitrates. Although the present invention is described below with respect to adaptive streaming systems and block-based video encoding techniques such as HEVC/H.265 and H.265 AVC, the systems and methods described are equally applicable in conventional streaming systems where different streams of video data are selected based upon a network client's connection quality and video encoding techniques that are not block-based.

In adaptive streaming systems, multimedia content is encoded as a set of alternative streams of video data. Because each alternative stream of video data is encoded using the same source multimedia content, similar encoding information is determined in the encoding of each alternative stream of video data. Encoding information can include, but is not limited to, frame complexity measure, selection of block sizes, block mode distribution and motion estimation results. Systems and methods in accordance with many embodiments of the invention reuse encoding information determined in the encoding of one alternative stream of video data in the encoding of at least one other alternative stream of video data. By reusing encoding information in the encoding of several alternative streams of video data, significant improvements in the encoding of the alternative streams of video data can be achieved and particularly significant time savings may be realized in accordance with embodiments of the invention.

Adaptive streaming systems are configured to stream multimedia content encoded at different maximum bitrates and resolutions over a network, such as the Internet. Adaptive streaming systems stream the highest quality multimedia content, which can be supported based upon current streaming conditions. Multimedia content typically includes video and audio data, subtitles, and other related metadata. In order to provide the highest quality video experience independent of the network data rate, adaptive streaming systems are configured to switch between the available sources of video data throughout the delivery of the video data according to a variety of factors, including, but not limited to, the available network data rate and video decoder performance. When streaming conditions deteriorate, an adaptive streaming system typically attempts to switch to multimedia streams encoded at lower maximum bitrates. In the event that the available network data rate cannot support streaming of the stream encoded at the lowest maximum bitrate, then playback is often disrupted until a sufficient amount of content can be buffered to restart playback. Systems and methods for switching between video streams during playback that may be utilized in adaptive streaming system in accordance with embodiments of the invention are described in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the entirety of which is incorporated by reference.

To create the multiple sources of video data utilized in adaptive streaming systems, a source encoder can be configured to encode a plurality of alternative streams of video data from a source video contained in a piece of multimedia content. Systems and method for encoding a source video for use in adaptive streaming systems are disclosed in U.S. Patent Application Ser. No. 13/221,794, entitled "Systems and Methods for Encoding Source Media in Matroska Container Files for Adaptive Bitrate Streaming Using Hypertext Transfer Protocol" to Braness et al., filed Aug. 30, 2011, the entirety of which is incorporated by reference. In accordance with embodiments of the invention, a source encoder may be implemented using a media source and/or a media server.

As stated above, alternative streams of video data based on the same source video contain similar content, therefore, statistics determined from the source content and encoding information determined for one alternative stream of video data may be used in the encoding of one or more of the other alternative streams of video data. In accordance with embodiments of the invention, a set of alternative streams of video data based on the same source video may contain video data at the same resolution but differing bitrates. In many embodiments of the invention, the motion estimation results calculated for the encoding of a particular alternative stream of video data can be reused amongst other alternative streams of video data. As is discussed below, a variety of statistics and encoding information determined in the encoding of alternative streams of video data may be reused amongst the alternative streams of video data. Systems and methods for sharing statistics and encoding information in encoding alternative streams of video data in accordance with embodiments of the invention are discussed further below.

Adaptive Streaming System Architecture

Adaptive streaming systems in accordance with embodiments of the invention are configured to generate multiple streams of video to be made available for streaming to user devices. In many embodiments of the invention, an adaptive streaming system includes a source encoding server that performs the encoding of multiple streams of video from source media. An adaptive streaming system in accordance with embodiments of the invention is illustrated in FIG. 1. The illustrated adaptive streaming system 10 includes a source encoding server 12 configured to encode source media as a number of alternative streams. The source media may be stored on the encoding server 12 or retrieved from a media source 13. As is discussed further below, the source encoding server 12 generates container files containing the encoded streams, at least a plurality of which are alternative streams of encoded video. The encoding server makes a first pass to collect statistics on the content at each output resolution and a second pass to encode the content into multiple output streams, where the streams can have various resolutions and bitrates. In some embodiments, the first pass is completed before the second pass begins. In other embodiments, the second pass can commence before the first pass is completed. In other words, computational processes for the first and second passes can run simultaneously where frames are processed by the first pass process(es) before being processed by the second pass process(es). These files are uploaded to a content server 14, which can be an HTTP server. A variety of playback devices 18, 20, and 22 can then request portions of the encoded streams from the content server 14 via a network 16 such as the Internet.

Although a specific adaptive streaming system for delivering media content streams is discussed above with respect to FIG. 1, any of a variety of streaming systems can be utilized to deliver media content streams in accordance with embodiments of the invention.

Source Encoders

Figure 2:
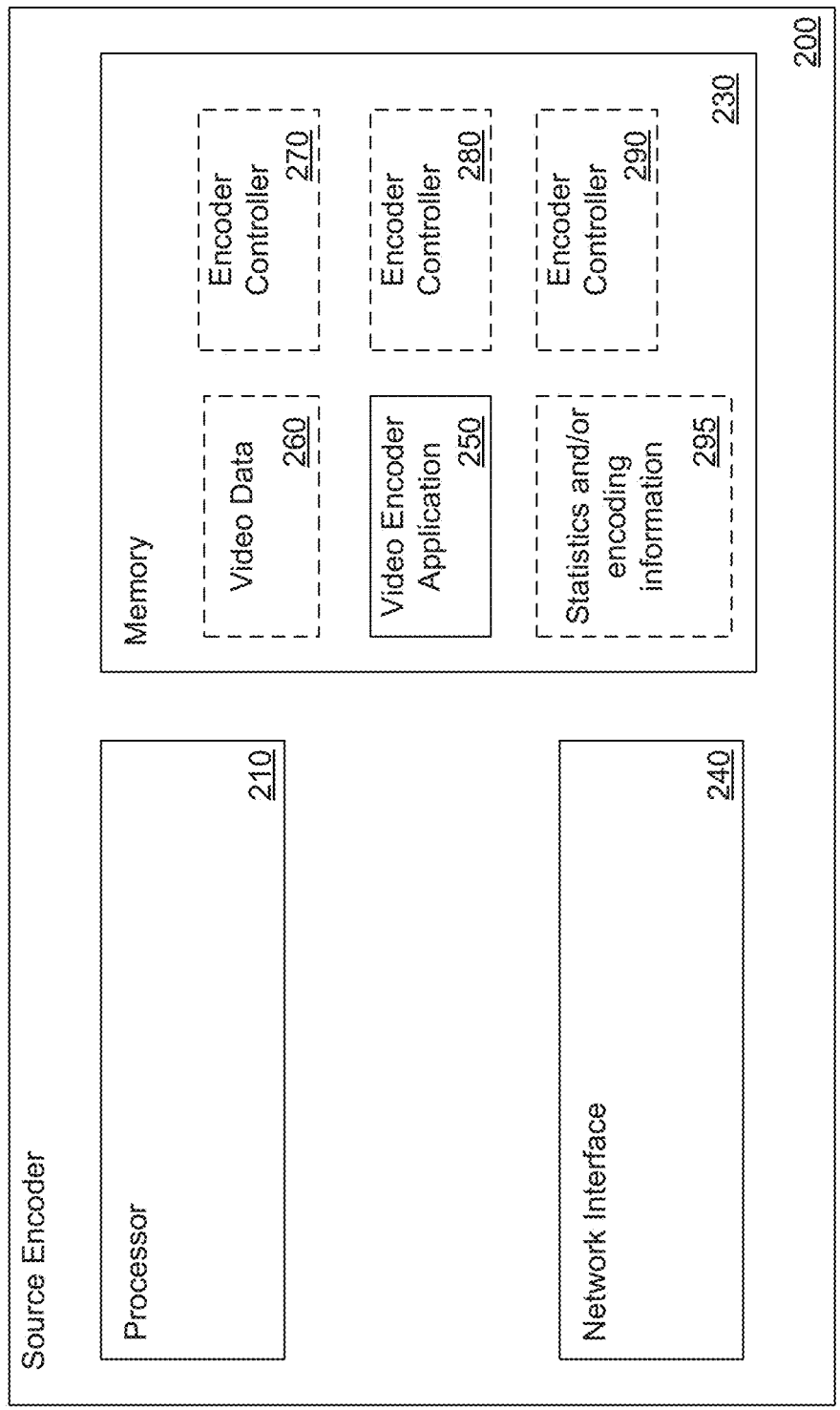
FIG. 2 conceptually illustrates a media server configured to encode streams of video data for use in adaptive streaming systems in accordance with embodiments of the invention.

In the illustrated embodiment, the adaptive bitrate streaming system includes one or more source encoders capable of encoding a source streaming of video content into alternative streams of encoded video having different resolutions and/or bitrates. In many embodiments, the source encoder can be implemented using any device capable of encoding streams of multimedia, where the streams are encoded at different resolutions, sampling rates, and/or maximum bitrates. The basic architecture of an adaptive streaming system source encoder in accordance with an embodiment of the invention is illustrated in FIG. 2. The source encoder 200 includes a processor 210 in communication with memory 230 and network interface 240. In the illustrated embodiment, the volatile memory 230 includes a source encoding application 250. The processor is configured by the source encoding application 250 to encode a plurality of streams of video data from source video data 260, which is also in volatile memory. The source video data 260 may already be present in memory or may be received via the network interface 240.

In a number of embodiments, the source encoder includes multiple processors and the encoding process can be distributed among the multiple processors. In many embodiments, the source encoding application 250 can launch multiple processes that execute on one or more processors where each process is an encoder controller 270 that encodes one or more output streams. In further embodiments, each encoder controller encodes multiple output streams at the same resolution and at different bitrates. In several embodiments, an encoder controller for each of three output resolutions is launched to be executed on one or more processors, where the output resolutions are 768×432, 1280×720, and 1920×1080. In some embodiments, an encoder controller 270 encodes 768×432 outputs streams at two different bitrates, an encoder controller 280 at 1280×720 at three different bitrates, and an encoder controller 290 at 1920×1080 at three different bitrates. Encoder controllers 270, 280, and 290 typically reside in memory 230 when they are executing. In accordance with many embodiments of the invention, encoder controllers 270, 280, and 290 have shared data buffers 295 in memory for data exchange of statistics, encoding information, and other information between the controllers.

Although a specific architecture for a source encoder is illustrated in FIG. 2, any of a variety of architectures including architectures where the video encoder 250 is located on disk or some other form of storage and is loaded into memory 230 at runtime can be utilized to encode multimedia content in accordance with embodiments of the invention. Systems and methods for the reuse of statistics and encoding information in the encoding of alternative streams of video data in accordance with embodiments of the invention are discussed further below.

Collecting and Using Statistics and Encoding Information

In many embodiments of the invention, statistics and encoding information are determined for a piece of media content before encoding the content into multiple output streams. As will be discussed in greater detail further below, the statistics and encoding information can be saved and shared between encoding processes to accelerate decision making about how to encode the content. Statistics to collect in a first pass can include (but are not limited to): average quantization parameter, size of header bits, size of texture bits, number of intra macroblocks/CTUs, number of inter macroblocks/CTUs, number of skip macroblocks/CTUs. Encoding information can include (but is not limited to): frame complexity measures, coding tree unit (CTU) structure, mode distribution, and motion information. The collection and use of encoding information in the encoding of alternative streams of video in accordance with embodiments of the invention are discussed below.

Frame Complexity Measure

Before encoding source content, a frame complexity measure can be assigned to each frame of the content. The frame complexity measure represents the level of complexity of visual information in a frame and thereby an indication of the data that will result in the output content stream from encoding that frame (i.e., in bits). Algorithms including those known in the art can be utilized in accordance with embodiments of the invention to calculate a frame complexity measure. Such algorithms may consider inter (i.e., between) and intra (i.e., within) frame measurements such as deviation of values such as color and brightness from the average values across pixels in a frame or corresponding pixels in multiple frames, and/or similarities between pixels and/or blocks of pixels in frames with those in previous frames. Furthermore, algorithms may calculate measurements similar to those used in encoding content in conducting motion estimation.

As will be discussed further below, the frame complexity measure can be used in choosing the parameters with which to encode a frame from an input stream into a frame in an output stream. In many embodiments of the invention, a frame complexity measure is assigned to each frame of the content and is expressed as an integer, where a greater value indicates greater complexity within the frame. In further embodiments of the invention, a frame complexity measure is assigned to a frame in an input stream and the same measure is used to choose the parameters for encoding the corresponding frames in a plurality of alternative output streams.

Bitrate control algorithms including those known in the art can be utilized in accordance with embodiments of the invention to determine how many bits to allocate to each encoded frame of video and buffer levels of the output stream and to choose the quantization levels to apply when encoding each frame of video. In accordance with embodiments of the invention, these algorithms can utilize the frame complexity measure that was computed once for an input content stream and reuse the measure to determine the quantization level for multiple output streams encoded from that input stream.

Block Size Decisions

In block-oriented encoding standards, pixels are taken as partitions or "blocks" in the encoding process. In some modern standards, the block size is variable where partitions in a frame can have different sizes. The HEVC standard uses partitions known as Coding Tree Units (CTUs) where the block size of a CTU is typically 64×64, 32×32, 16×16, or 8×8 pixels. A frame of video can include a mixture of CTUs of different sizes and arrangements. Often, block sizes of CTUs (or other "block" partitions of pixels as per the relevant video compression standard) in a frame are chosen based on efficiency and the resulting size in bits of an encoded frame. An encoder in accordance with embodiments of the invention can accelerate decisions on block sizes to use in encoding frames of content for an output stream when it has already made similar decisions for corresponding portions of frames in another alternative output stream.

An encoder typically chooses block sizes based at least in part on the size (in bits) of the resulting encoded output frame while maintaining image quality of the frame. Usually, a smaller size of output frames (i.e., more efficient) is desired and can be accomplished with higher compression using larger block sizes in encoding. The encoder can try using larger block sizes in encoding a portion of a frame and, if quality or accuracy of the resulting image does not meet a threshold, try progressively smaller block sizes for that portion of the frame. For example, a 32×32 pixel portion of a frame can be tested to encode as four 16×16 pixel CTUs. If any of the 16×16 pixel CTUs is not desirable, it can be further divided into four 8×8 pixel CTUs. In other video standards, the larger and smaller block sizes specified in a particular standard can be tested in similar fashion.

In accordance with embodiments of the invention, certain data can be retained and shared between encoder controllers that are encoding alternative output streams from the same input stream. The shared data can include block sizes that were tested on portions of frames. For example, if an encoder controller has chosen to process a 32×32 pixel portion of the frame as four 16×16 CTUs (or any other combination of CTU sizes), when the encoder controller or another encoder controller encodes the same portion of the frame at the same resolution but a different bitrate it can skip the previously made decision(s) and use the same size CTUs and/or test other CTU sizes. At higher bitrates, it can be unnecessary to test larger block sizes because the higher bitrate can accommodate more stored information and therefore the higher compression resulting from larger block sizes is unneeded. Therefore, when an encoder controller encodes the same portion of a frame at a higher bitrate, it can skip the previous test/decision not to encode with 32×32 pixel CTUs and simply use 16×16 CTUs and/or test if 8×8 pixel CTUs would achieve the same or better quality while meeting the target bitrate.

Past CTU size choices can also be useful in picking CTU sizes in a stream of a different resolution. For example, suppose a CTU size of 32×32 was tested and rejected for a portion of a frame in a stream with resolution 1920×1080 in favor of 16×16 or smaller partitions. The same portion of the frame in a stream of resolution 3840×2160 would cover a size of 64×64. The encoder can skip checking a CTU size of 64×64 for that portion in the higher resolution frame because the size of 32×32 was rejected in the lower resolution stream. The encoder can start by testing CTU sizes of 32×32 and smaller.

Figure 3:
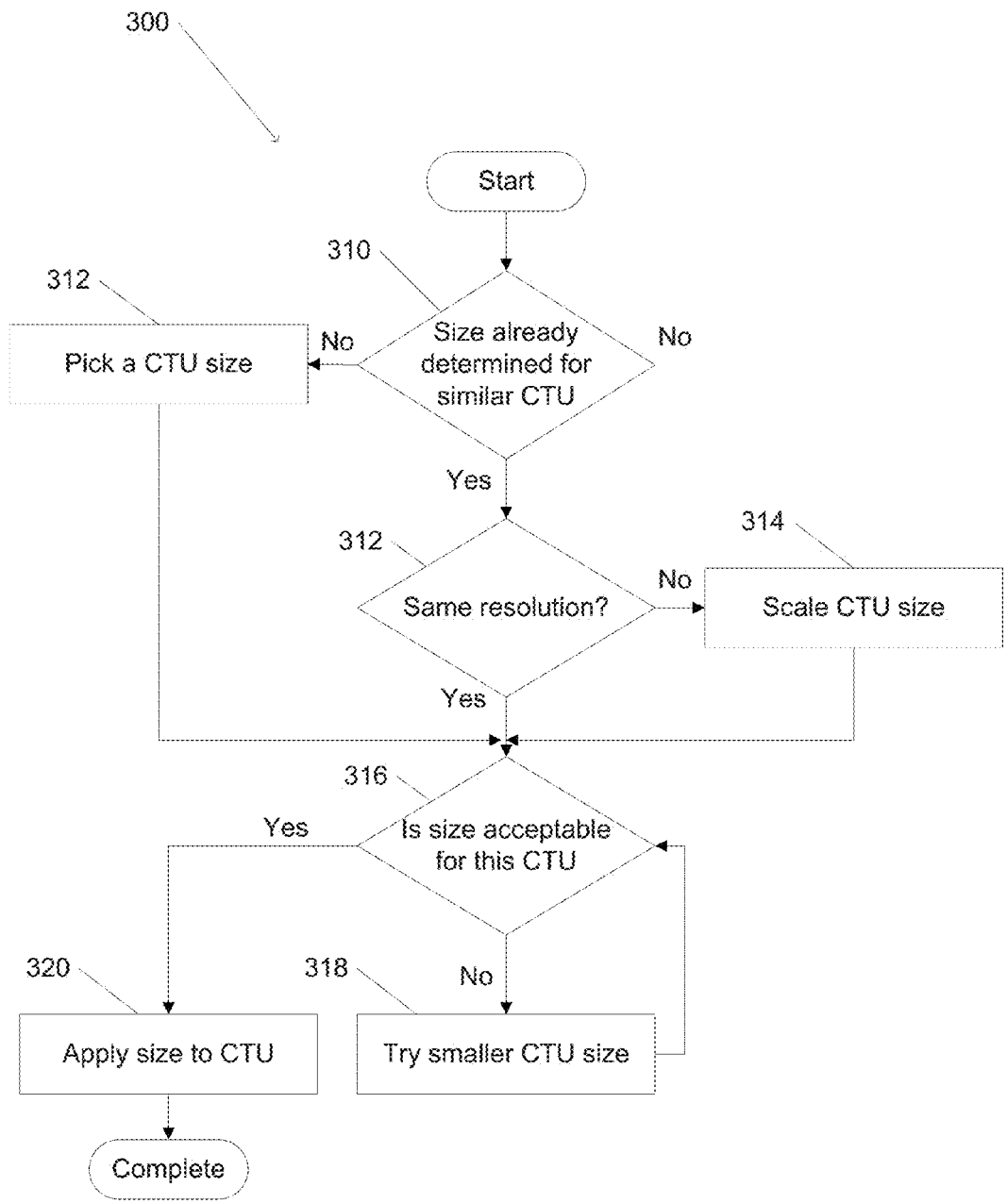
FIG. 3 is a flow chart illustrating a process for reusing block size information in encoding streams of video in accordance with embodiments of the invention.

A process for reusing block size information in encoding a stream of video in accordance with embodiments of the invention is illustrated in FIG. 3. The process includes checking (310) if a size has been determined for a similar CTU (i.e., a corresponding CTU in a corresponding frame in another stream). If not then a CTU size is chosen (312) to be tested, typically starting from a larger size. If a size has been determined for a similar CTU, the resolution of the source stream of the similar CTU is compared (312) to the current stream. If the resolution is different, the CTU size is scaled (314) to the current stream. The predetermined CTU size (if predetermined) or the chosen CTU size (if not predetermined) is tested (316) for the current CTU being encoded. If the size is not acceptable, a smaller CTU size is attempted (318). If the size is acceptable, the CTU size is applied (320) to the current CTU.

Although a specific process for reusing CTU size determinations in encoding stream of videos is discussed above with respect to FIG. 3, any of a variety of processes can be utilized to reuse CTU (or other "block" partitions of pixels as per the relevant video compression standard) size determinations in encoding multiple media content streams in accordance with embodiments of the invention. Moreover, it is understood to one skilled in the art that "block" partitions in video standards other than HEVC may have sizes available other than those discussed here, and that the techniques for choosing block sizes discussed here are equally applicable. As will be discussed further below, decisions by one encoder controller (i.e., a software process encoding multiple streams at the same resolution and different bitrates) can be stored and reused by that encoder controller or by another encoder controller encoding a different resolution.

Mode Distribution and Mode Choices

Mode distribution refers to the overall ratio of intra, inter, and skip macro blocks (or other "block" partitions of pixels as per the relevant video compression standard) within a frame of video. Predicted frames such as P frames and B frames can contain intra (encoded only with information within the frame) and/or inter (encoded with reference to information in another frame) frame macroblocks. Under different video compression standards, block pixel partitions may be referred to variously as macroblocks or Coding Tree Units (CTUs). Mode distribution can refer to block types whether the block itself is called a macroblock or CTU. Tests and/or algorithms, including those known in the art, can be utilized to analyze each macroblock in a frame to see which type of block is the most efficient at encoding that block while maintaining image quality. For example, a measure of encoding efficiency can be the number of bits needed to encode a particular macroblock.

For encoding efficiency and image quality it is often desirable to maintain as close as possible to the same mode distribution across the corresponding frames in alternate streams. For example, given a frame p with 30% intra blocks, 60% inter blocks, and 10% skip blocks, the corresponding frame p1 in a first alternate stream at the same resolution and a different bitrate should have a similar distribution of intra, inter, and skip blocks, i.e., a target mode distribution. The corresponding frame p2 in a second alternate stream at a different resolution and a different bitrate ideally will also have a similar distribution of block types.

The mode distribution can be used to accelerate decisions made by the encoder as to what block type to use when processing blocks in a frame. By seeking to conform to a determined mode distribution, the number of decisions can be reduced. For example, towards the end of processing a particular frame the mode distribution of the frame may deviate from the target mode distribution. Therefore, blocks can be chosen to be a certain type (e.g., intra, inter, skip) in order to bring the resulting mode distribution after encoding those blocks closer to the target mode distribution while maintaining good quality and integrity of the image. In various embodiments of the invention, the decisions in choosing block types may differ between streams at different bitrates because more complexity (e.g., more intra coded blocks) can be accommodated at higher bitrates.

Figure 4:
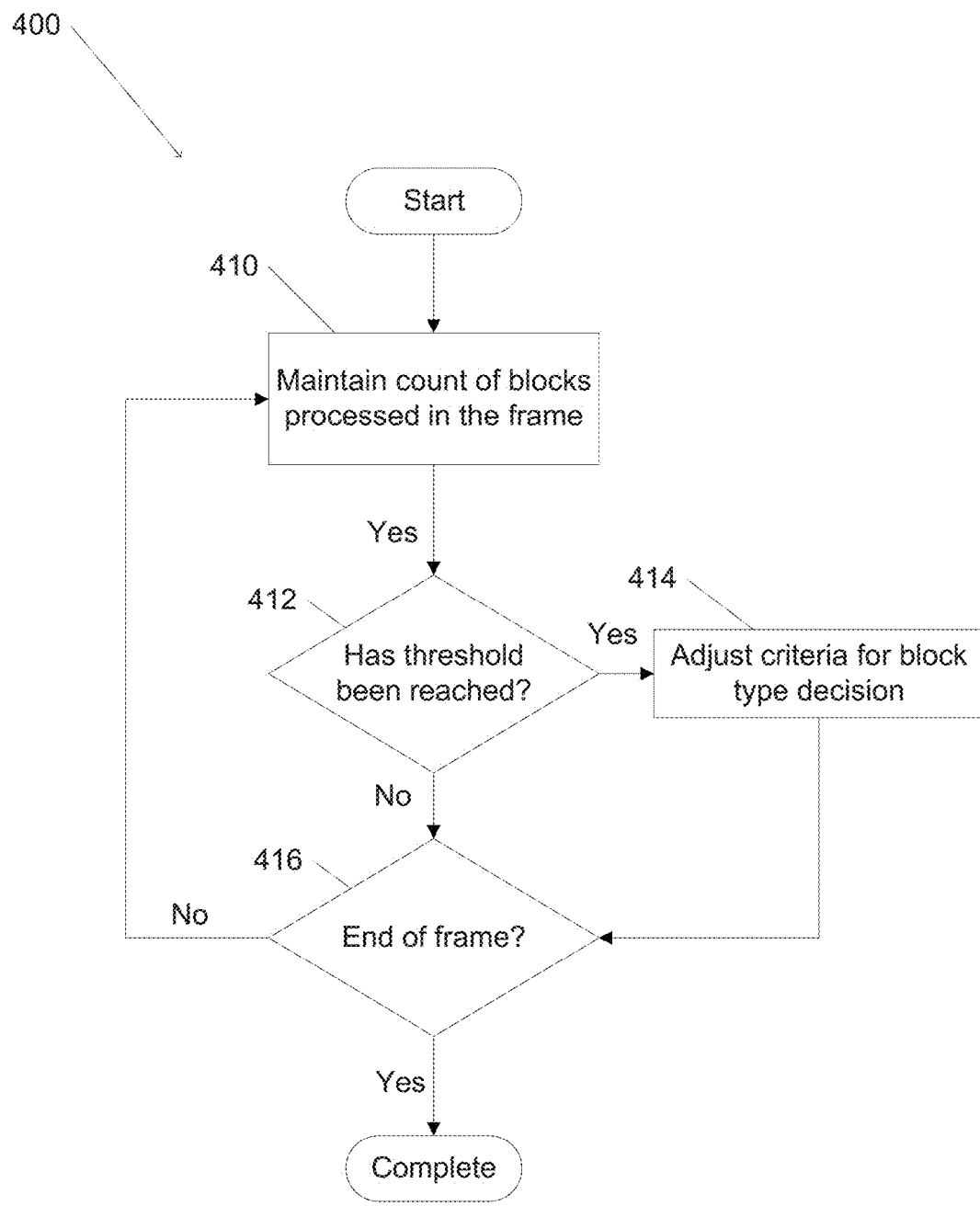
FIG. 4 is a flow chart illustrating a process for adjusting block type decisions in encoding streams of video in accordance with embodiments of the invention.

A process for adjusting block type decisions in accordance with embodiments of the invention is illustrated in FIG. 4. The process 400 can be utilized when blocks in a frame are being encoded or when the frame is being analyzed and block types are being chosen without being encoded. The process includes maintaining (410) a count of blocks that have been processed (e.g., analyzed or encoded). If a threshold number of blocks has been reached, or alternatively a proportion of the total blocks in the frame, the criteria for choosing block types can be adjusted (414) more in favor of choosing block types that would maintain a target mode distribution of blocks in the frame. If the end of the frame has not been reached (416), processing continues for blocks in the frame and updating (410) a count of the blocks that have been processed.

Although a specific process for adjusting block type decisions in encoding streams of video is discussed above with respect to FIG. 4, any of a variety of processes can be utilized to adjust block type decisions in encoding multiple media content streams in accordance with embodiments of the invention.

Motion Estimation

In video compression, predicted frames such as P frames and B frames draw information from a reference frame (which can be an I, P, or B frame) and contain information such as motion vectors and residual data used in motion estimation. A motion vector for a block of pixels (e.g., a macroblock, CTU, or similar partition) typically describes where in the predicted frame to place the indicated block of pixels from the reference frame. Residual data describes any differences between the block of pixels and the reference block of pixels. In many embodiments of the invention, motion estimation information such as motion vectors can be reused from one output stream to another output stream at a different resolution and/or bitrate.

In several embodiments of the invention, motion vectors are generated for at least one output stream at a given resolution and bitrate. The motion vectors are then be applied and refined when encoding at least one other output stream at the same resolution at a different bitrate. In further embodiments of the invention, motion vectors that are generated for an output stream are applied and refined when encoding at least one other output stream at a higher resolution. The motion vectors are scaled proportionally to the difference in resolution between the first stream and second stream and then refined to take advantage of the higher precision available in the higher resolution. For example, motion vectors generated for a stream of resolution 768×432 can be used in encoding a stream of resolution 1280×720 by multiplying the horizontal component of a vector by 1280/768 and the vertical component of a vector by 720/432. The multipliers 1280/768 and 720/432 can be considered scale factors for that change in resolution. Furthermore, an encoder may determine that the encoding cost of a motion vector and residual data for a macroblock is very low and may skip checking the encoding cost for that macroblock in another output stream. In this way, motion vectors can be reused across multiple output streams and motion estimation is accelerated by not having to generate new motion vectors. Other techniques for sharing and/or reuse of motion estimation information across multiple output streams can be utilized in accordance with embodiments of the invention. Systems and methods for reusing motion estimation information in encoding alternative streams are disclosed in U.S. patent application Ser. No. 13/485,609, entitled "Systems and Methods for the Reuse of Encoding Information in Encoding Alternative Streams of Video Data" to Zurpal et al., filed May 31, 2012, the entirety of which is incorporated by reference.

Figure 5:
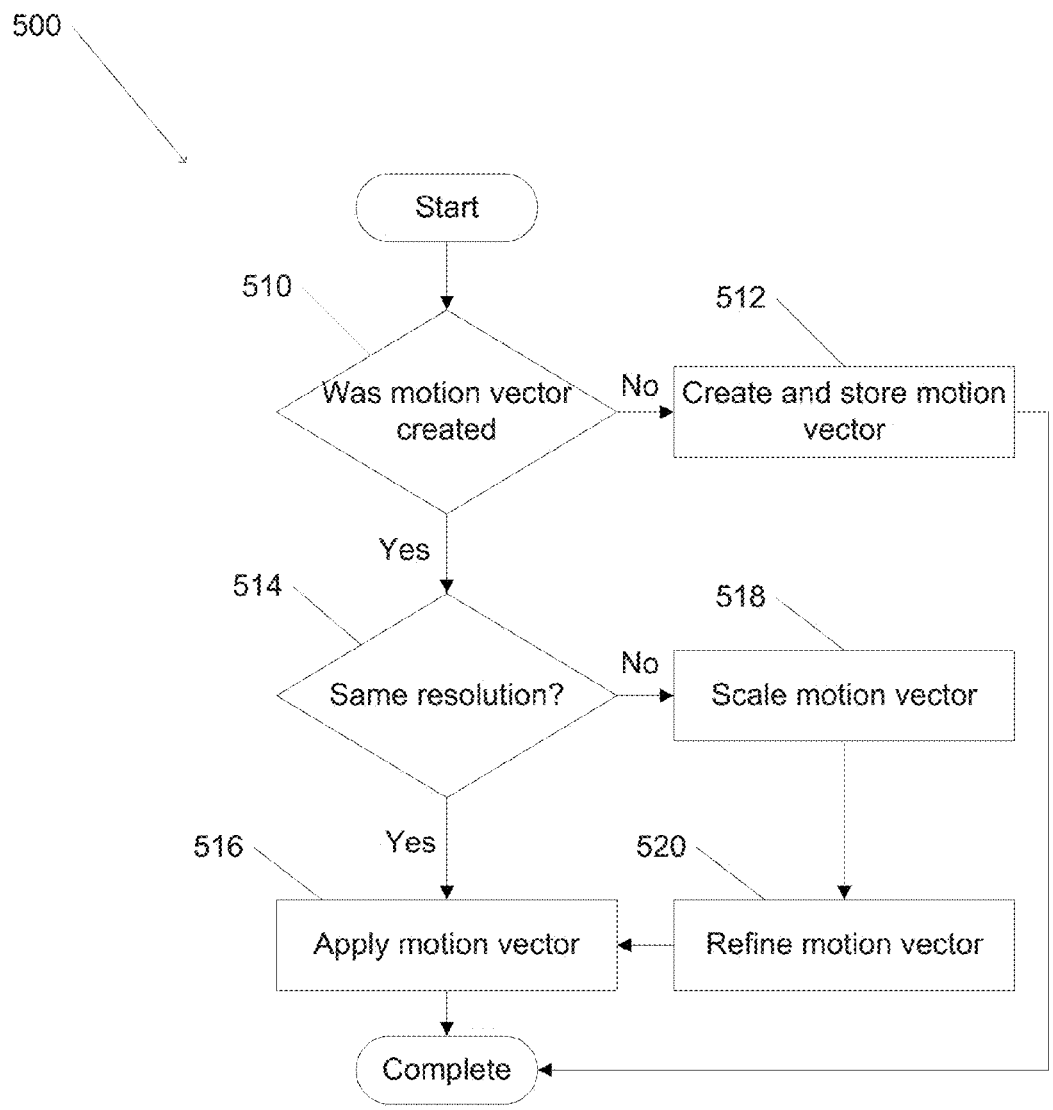
FIG. 5 is a flow chart illustrating a process for reusing motion vectors in encoding streams of video in accordance with embodiments of the invention.

A process for reusing motion vectors in encoding a stream of video in accordance with embodiments of the invention is illustrated in FIG. 5. When encoding a frame in a stream of video, an encoder can check (510) if a motion vector was already created for a corresponding macroblock/CTU in a different stream of video that can be reused in encoding the current frame. If not, a new motion vector is created and stored (512). If a motion vector exists, the encoder can check (514) if the other stream of video is at the same resolution as the current stream. If it is the same resolution, the motion vector can be applied directly (516). The motion vector can also be refined with a search, such as with a small diamond search over one or two neighboring pixels or with sub-pixel refinement. Various other search patterns can alternatively be utilized to refine the motion vector. If it is a different resolution, the motion vector can be scaled (518) and refined (520) to the current resolution before being applied.

Although a specific process for reusing motion vectors in encoding a stream of video is discussed above with respect to FIG. 5, any of a variety of processes can be utilized to reuse motion vectors in encoding multiple media content streams in accordance with embodiments of the invention.

Two-Pass Encoding Content for Adaptive Bitrate Streaming

Encoding content using a two-pass process can provide efficiencies through the sharing and reuse of information. In many embodiments of the invention, an encoder receives content, analyzes the content in a first pass and encodes the content in a second pass. Statistics and other information collected in the first pass can be used to accelerate encoding in the second pass and statistics and encoding information can be shared between encoding processes in the second pass. In some embodiments, the first pass is completed before the second pass begins. In other embodiments, the second pass can commence before the first pass is completed. In other words, computational processes for the first and second passes can run simultaneously where frames are processed by the first pass process(es) before being processed by the second pass process(es).

Figure 6:
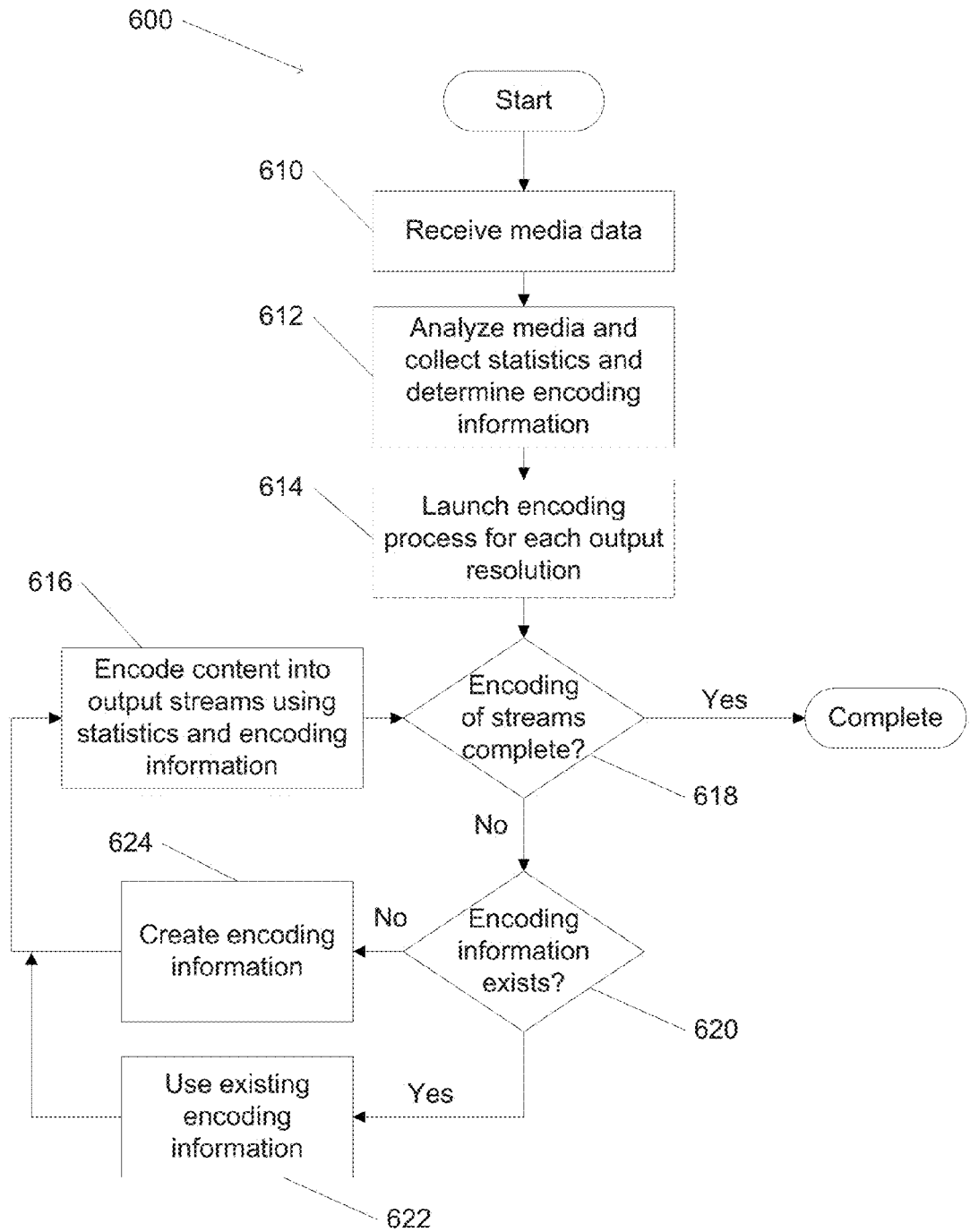
FIG. 6 is a flow chart illustrating a process for sharing statistics and encoding information in the encoding of alternative streams of video data in accordance with embodiments of the invention.

A process for encoding content in accordance with an embodiment of the invention is illustrated in FIG. 6. The encoding process 600 includes receiving media content (610). The content can be contained in a single input file (e.g., a multimedia file or container format file) or collection of media files. The content may also be an input stream of video received by the encoder. In several embodiments of the invention, the encoding process is implemented on an encoding server as an encoding application and disk read/write operations are reduced because each input frame only needs to be read once.

The encoding process also includes making a first pass to collect statistics on the media stream (612). The first pass is intended to make an initial analysis of the content in the source input video stream and collect statistics for each resolution to be encoded. In many embodiments of the invention, the input stream is converted into a stream for each desired output resolution and statistics are collected on each stream. The conversion can include color conversion (e.g., RGB to YUV etc., ITU601 to 709, or format specific conversions) and resizing the dimensions/resolution of each frame. Encoding information such as a frame complexity measure can be assigned to each frame in a stream based on the level of complexity of the image data in the frame using techniques as discussed further above. A mode distribution can be determined for each frame as well. Complexity measures and mode distributions can be used as input to the encoding of the final streams.

Other encoding information can include the size of header data and the size of macroblock data to be used in encoding the streams. Given header size, the encoder can estimate how many bits are allocated to overhead data and how many bits are available to encode the content. Macroblock size can also contribute to better estimates of bit allocation when encoding the content. For effective rate control, the relative proportion of header size to macroblock size should be consistent across output streams. Header size, macroblock size, and/or the relative proportion of header size to macroblock size can be provided as encoding parameters to the encoding process.

Encoding information can also include hypothetical reference decoder (HRD) data. An HRD model is specified in some video compression standards to aid in calculating frame sizes and buffer fullness. The HRD reproduces decoder behavior on an encoder to avoid buffer overflow in a playback device buffer. HRD data can be determined in a first analysis pass and saved in shared buffers or local caches for use in a second encoding pass.

Other statistics collected for one resolution can be used to accelerate decisions for encoding streams at various bitrates at the same resolution and/or another resolution. Statistics to collect in a first pass can include (but are not limited to): average quantization parameter, size of header bits, size of texture bits, number of intra macroblocks/CTUs, number of inter macroblocks/CTUs, number of skip macroblocks/CTUs. In several embodiments of the invention, statistics can be cached internally (e.g., output to single file) and/or stored in shared buffers in memory that are accessible to each encoder controller when encoding in the second pass.

In a second pass, the content is encoded (616) into output streams. In many embodiments of the invention, a separate thread or process is launched (614) by the encoding application for each output resolution where each thread or process is referred to as an encoder controller. In further embodiments of the invention, each encoder controller encodes multiple output streams at the same resolution but at different bitrates. In several embodiments of the invention, an encoding server has multiple processors and the encoder controllers may each run on different processors or otherwise distributed across the processors. Output streams may be encoded at a constant bit rate (CBR) or variable bit rate (VBR).

Until the encoding of streams is completed (618), the encoder controllers can run simultaneously using information and statistics stored in internal caches and/or shared buffers in memory. An encoder controller can check (620) the memory for whether encoding information exists for the blocks and/or frames it is encoding and utilize (622) that information in processing the current block or frame. As discussed further above, different types of encoding information can be used to allow the encoder to skip decisions or can be used as a starting point to determine encoding information for processing the current block or frame. If the information does not yet exist, it can be created (624) and encoding (616) of the stream continues.

Shared information can include motion estimation information such as motion vectors. Motion vectors generated for a stream may be reused in encoding another stream at the same resolution or at a different resolution. As discussed further above, a motion vector reused to encode a stream at a higher resolution may be scaled to compensate for the difference in resolution and refined. Some statistics may be specific to the resolution of the stream being encoded. As discussed above, CTU size choices at a certain resolution and bitrate may be retained and applied to encoding the same resolution at a higher bitrate. When an encoder controller has made a decision for CTU size in a portion of a frame, it may skip that decision when encoding the same portion of the frame at a higher bitrate and reuse the CTU size or try smaller CTU sizes.

In many embodiments of the invention, a CTU in a given portion of a frame is encoded sequentially by the same encoder controller for a plurality of output streams at different bitrates. After an encoder controller encodes a CTU for an output stream, if it encodes the CTU for a different output stream soon thereafter, the data required to encode that CTU is likely to still be in the processor cache or other local memory. In accordance with embodiments of the invention, an encoder controller encodes a CTU for each output stream sequentially one after another. The corresponding CTUs for each output stream may be encoded using different quantization parameters for streams at different bitrates.

Encoding with block-oriented video compression typically involves factoring in a quantization parameter that contributes to the compression of the image information within a frame. The quantization parameter for a frame is typically selected based upon factors such as a frame complexity measure and mode distribution of the frame and is selected so that the encoded frame is a target size (in bits) while maintaining the best image quality possible. As discussed further above, values for a frame complexity measure and mode distribution can be determined for a frame of an input stream and utilized in processing corresponding output frames in multiple output streams. Quantization parameter(s) from a previous frame can be used as a starting value and refined using a frame complexity measure and mode distribution for the current frame. For example, if the next frame has a lower complexity measure than the previous frame, the quantization parameters can be increased for that frame because a less complex image can be compressed more without severe loss of fidelity. Quantization parameters can be decreased when encoding the same frame for a higher bitrate stream because of the higher capacity for data in the higher bitrate. In many embodiments of the invention, quantization parameters can be independently determined for corresponding frames in each output stream using the same frame complexity measure and mode distribution while adjusting for the target bitrate of each output stream. Quantization parameters determined for CTUs in a frame in lower bitrate output stream can be referred to and decreased for the corresponding CTUs in a higher bitrate output stream. Encoders in accordance with embodiments of the invention can calculate rate distortion information when encoding output streams and reuse the rate distortion information to choose quantization parameters when encoding an output stream at a higher bitrate. In several embodiments of the invention, each frame in each output stream is encoded such that its mode distribution is approximately equal to a target mode distribution determined using the source frame from the input stream. Other types of shared information that can be accessible and used by different encoder controllers further above.

To facilitate the switching of streams during playback, a set of alternative streams of video content should have intra frames (I frames) in the same position in each stream. Where there is an I frame in one stream, the corresponding frames at the same position (i.e., time) in each of the other alternative streams should be an I frame. Because an I frame includes all the information necessary to render the frame, when a playback device needs to switch streams it can switch at an I frame so that playback is seamless without missing frames. In many embodiments of the invention, I frames are encoded for frames in the same position in a plurality of alternative output streams. Where a P frame or B frame has been encoded for an output stream, an encoder can skip testing to encode the corresponding frame in the same position as an I frame when encoding another output stream and can encode the frame as a B frame or P frame.

Although a specific process for encoding multiple media content streams utilizing shared statistics is discussed above with respect to FIG. 6, any of a variety of processes can be utilized to encode multiple media content streams for adaptive bitrate streaming in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A source encoder comprising:
   memory containing a source encoder application;
   a shared memory; and
   at least one processor capable of executing the source encoding application to:
   receive multimedia content, where the multimedia content comprises source video data having a primary resolution;
   collect statistics on source video data and write the statistics to shared memory in a first pass through the received multimedia content;
   determine initial encoding information for source video data and write the initial encoding information to shared memory during the first pass through the received multimedia content; and
   encode the source video data in parallel using collected statistics and initial encoding information to produce a plurality of alternative video streams during a second pass through the received multimedia content with a plurality of parallel encoding processes, where the encoding of the source video utilizes additional encoding information, the parallel encoding processes are configured to reuse additional encoding information that has already been determined for a portion of video by another parallel encoding process and stored in the shared memory, and the parallel encoding processes are configured to generate additional encoding information that has not already been determined for a portion of video by another parallel encoding process and store the generated additional encoding information in the shared memory;
   wherein the parallel encoding processes being configured to generate additional encoding information that has not already been determined for a portion of video by another parallel encoding process further comprises determining a Coding Tree Unit (CTU) size for encoding a portion of a frame of video in the source video data; and
   wherein determining a CTU size for encoding a portion of a frame of video in the source video data comprises:
      selecting a portion of a frame of video to encode as at least one output CTU in a first output stream;
      checking if a size has been determined for a similar CTU;
      selecting a CTU size if a size has not been determined for the similar CTU;
      selecting a previously determined CTU size that was determined for a second output stream and comparing the resolution of the first output stream to the resolution of the second output stream if a size has been determined for a similar CTU;
      scaling the CTU size if the resolution of the first output stream is not the same resolution as the second output stream;
      determining if the selected CTU size is acceptable for the output CTU;
      selecting a smaller CTU size when the selected CTU size is not acceptable; and
      applying the selected CTU size to the portion of the frame of video if the selected CTU size is acceptable for the output CTU.

2. The source encoder of claim 1 wherein statistics on source video data comprises statistics selected from the group consisting of: average quantization parameter, size of header bits, size of texture bits, number of intra blocks, number of inter blocks, and number of skip blocks.

3. The source encoder of claim 1 wherein the parallel processing system being configured to determine initial encoding information for source video data further comprises the parallel processing system configured to calculate a frame complexity measure.

4. The source encoder of claim 1 wherein the parallel processing system being configured to determine initial encoding information for source video data further comprises the parallel processing system configured to determine a mode distribution for at least one frame of video in at least one of the plurality of alternative video streams.

5. The source encoder of claim 4 wherein the parallel processing system being configured to encode the source video data in parallel using collected statistics and initial encoding information to produce a plurality of alternative video streams further comprises the parallel processing system being configured to:
   maintain a count of blocks processed in a frame of video in an alternative video stream;
   determine a threshold number of blocks based on the mode distribution; and
   adjust criteria for block type decisions if the count of blocks meets the threshold number of blocks.

6. The source encoder of claim 1 wherein the parallel encoding processes being configured to reuse additional encoding information that has already been determined for a portion of video by another parallel encoding process and stored in the shared memory further comprises the parallel encoding processes being configured to:
- determine whether a motion vector exists for a second corresponding block in a second alternative stream when encoding a first block in a video frame in a first alternative stream;
- determine if the first alternative stream and the second alternative stream are the same resolution;
- scale the motion vector if the first alternative stream and the second alternative stream are not the same resolution;
- refine the motion vector; and
- apply the motion vector in encoding the first block in the video frame in the first alternative stream.

7. The source encoder of claim 1 wherein initial encoding information further comprises header size, macroblock size, and the relative proportion of header size to macroblock size.

8. The source encoder of claim 1 wherein initial encoding information further comprises hypothetical reference decoder data.

9. The source encoder of claim 1 wherein each of the parallel encoding processes encodes at a different resolution.

10. The source encoder of claim 9 wherein each of the parallel encoding processes encodes one or more alternative video streams and each of the alternative video streams encoded by a parallel encoding process is a different bitrate.

11. The source encoder of claim 1 wherein each of the parallel encoding processes encodes a block from the source video data into each stream in a subset of the plurality of alternative video streams sequentially one after another.

12. The source encoder of claim 1 wherein additional encoding information comprises rate distortion information and quantization parameters.

13. A method for encoding source video as a number of alternative video streams, the method comprising:
- receiving multimedia content, where the multimedia content comprises source video data having a primary resolution using a source encoder;
- collecting statistics on source video data and writing the statistics to shared memory in a first pass through the received multimedia content using a source encoder;
- determining initial encoding information for source video data and writing the initial encoding information to a shared memory during the first pass through the received multimedia content using a source encoder; and
- encoding the source video data in parallel using collected statistics, initial encoding information, and additional encoding information to produce a plurality of alternative video streams during a second pass through the received multimedia content with a plurality of parallel encoding processes using a source encoder, where encoding of the source video further comprises:
  - reusing additional encoding information that has already been determined for a portion of video by another parallel encoding process and stored in the shared memory using at least one of the plurality of parallel encoding processes, and
  - generating additional encoding information that has not already been determined for a portion of video by another of the plurality of parallel encoding processes; and
  - storing the generated additional encoding information in the shared memory using a parallel encoder process;
- wherein generating additional encoding information that has not already been determined for a portion of video by another parallel encoding process further comprises
  - determining a Coding Tree Unit (CTU) size for encoding a portion of a frame of video in the source video data; and
- wherein determining a CTU size for encoding a portion of a frame of video in the source video data further comprises:
  - selecting a portion of a frame of video to encode as at least one output CTU in a first output stream;
  - checking if a size has been determined for a similar CTU;
  - selecting a CTU size if a size has not been determined for the similar CTU;
  - selecting a previously determined CTU size that was determined for a second output stream and comparing the resolution of the first output stream to the resolution of the second output stream if a size has been determined for a similar CTU;
  - scaling the CTU size if the resolution of the first output stream is not the same resolution as second output stream;
  - determining if the selected CTU size is acceptable for the output CTU;
  - selecting a smaller CTU size if the selected CTU size is not acceptable; and
  - applying the selected CTU size to the portion of the frame of video if the selected CTU size is acceptable for the output CTU.

14. The method of claim 13 wherein statistics on source video data comprises statistics selected from the group consisting of: average quantization parameter, size of header bits, size of texture bits, number of intra blocks, number of inter blocks, and number of skip blocks.

15. The method of claim 13 wherein determining initial encoding information for source video data further comprises calculating a frame complexity measure.

16. The method of claim 13 wherein determining initial encoding information for source video data further comprises determining a mode distribution for at least one frame of video in at least one of the plurality of alternative video streams.

17. The method of claim 16 wherein encoding the source video data in parallel using collected statistics, initial encoding information, and additional encoding information to produce a plurality of alternative video streams further comprises:
- maintaining a count of blocks processed in a frame of video in an alternative video stream;
- determining a threshold number of blocks based on the mode distribution; and
- adjusting criteria for block type decisions if the count of blocks meets the threshold number of blocks.

18. The method of claim 13 wherein reusing additional encoding information that has already been determined for a portion of video by another parallel encoding process and stored in the shared memory further comprises:
- determining whether a motion vector exists for a second corresponding block in a second alternative stream when encoding a first block in a video frame in a first alternative stream;
- determining if the first alternative stream and the second alternative stream are the same resolution;
- scaling the motion vector if the first alternative stream and the second alternative stream are not the same resolution;
- refining the motion vector; and
- applying the motion vector in encoding the first block in the video frame in the first alternative stream.

19. The method of claim 13 wherein initial encoding information further comprises header size, macroblock size, and the relative proportion of header size to macroblock size.

20. The method of claim 13 wherein initial encoding information further comprises hypothetical reference decoder data.

21. The method of claim 13 wherein each of the parallel encoding processes encodes at a different resolution.

22. The source encoder of claim 21 wherein each of the parallel encoding processes encodes one or more alternative video streams and each of the alternative video streams encoded by a parallel encoding process is a different bitrate.

23. The method of claim 13 wherein each of the parallel encoding processes encodes a block from the source video data into each stream in a subset of the plurality of alternative video streams sequentially one after another.

24. The method of claim 13 wherein additional encoding information comprises rate distortion information and quantization parameters.

* * * * *